(12) United States Patent
Stroburg

(10) Patent No.: US 9,140,237 B1
(45) Date of Patent: Sep. 22, 2015

(54) WINDMILL

(71) Applicant: Eldon Leonard Stroburg, Blockton, IA (US)

(72) Inventor: Eldon Leonard Stroburg, Blockton, IA (US)

( * ) Notice: Subject to any disclaimer, the term of this patent is extended or adjusted under 35 U.S.C. 154(b) by 0 days.

(21) Appl. No.: 14/599,686

(22) Filed: Jan. 19, 2015

(51) Int. Cl.
*F03D 3/06* (2006.01)
*F03D 3/00* (2006.01)

(52) U.S. Cl.
CPC .............. *F03D 3/068* (2013.01); *F03D 3/002* (2013.01)

(58) Field of Classification Search
CPC ..... F03D 3/067; F03D 7/0244; F03D 7/0248; F03D 7/0264; F03D 7/0268; F03D 11/0025; F05B 2240/2212; F05B 2240/231; F05B 2260/505
USPC ........... 415/4.3; 416/110, 111, 112, 116, 117, 416/119, 132 B, 136, 139, 140, 142
See application file for complete search history.

(56) References Cited

U.S. PATENT DOCUMENTS

| | | | | | |
|---|---|---|---|---|---|
| 384,232 | A | * | 6/1888 | Brodrick | 416/41 |
| 591,775 | A | * | 10/1897 | Peterson | 416/13 |
| 657,959 | A | * | 9/1900 | Rickman | 416/50 |
| 1,198,410 | A | * | 9/1916 | Bjornson | 416/118 |
| 1,333,987 | A | * | 3/1920 | McManigal | 415/4.1 |
| 1,618,549 | A | * | 2/1927 | O'Toole | 416/111 |
| 4,180,367 | A | * | 12/1979 | Drees | 416/119 |
| 7,766,602 | B1 | | 8/2010 | Stroburg | |

* cited by examiner

*Primary Examiner* — Dwayne J White
*Assistant Examiner* — Alexander White
(74) *Attorney, Agent, or Firm* — Daniel M. Northfield

(57) ABSTRACT

A windmill can include a first blade assembly including a plurality of blades, a sprocket and chain assembly configured to turn the first blade assembly in and out of an incoming wind, a wheel assembly, such that the wheel assembly supports the first blade assembly, and a fan assembly configured to move the sprocket and chain assembly to turn the first blade assembly a quarter turn for avoidance of damage to the windmill from a damaging wind. An ice-catcher may also move the blades out of damaging wind. The invention may include multiple blade assemblies attached to each other.

6 Claims, 12 Drawing Sheets

WINDMILL

FIELD OF THE INVENTION

The invention relates generally to the field of windmills for generating electricity or providing propulsion power.

BACKGROUND

Windmills have been used for many years, but can be limited by their structure. Accordingly, there is a need for a new and improved windmill.

SUMMARY OF INVENTION

According to an exemplary embodiment of the invention, a windmill can include a first blade assembly including a plurality of blades; a sprocket and chain assembly configured to turn the first blade assembly in and out of an incoming wind; a wheel assembly, wherein the wheel assembly supports the first blade assembly; and a fan assembly configured to move the sprocket and chain assembly to turn the first blade assembly a quarter turn for avoidance of damage to the windmill from a damaging wind. An ice-catcher may also move the blades out of damaging wind. The invention may include multiple blade assemblies attached to each other.

DETAILED DESCRIPTION

The following description is not intended to limit the scope of the invention, but to generally illustrate the invention. The invention belongs to the field of windmills.

Figure 1:
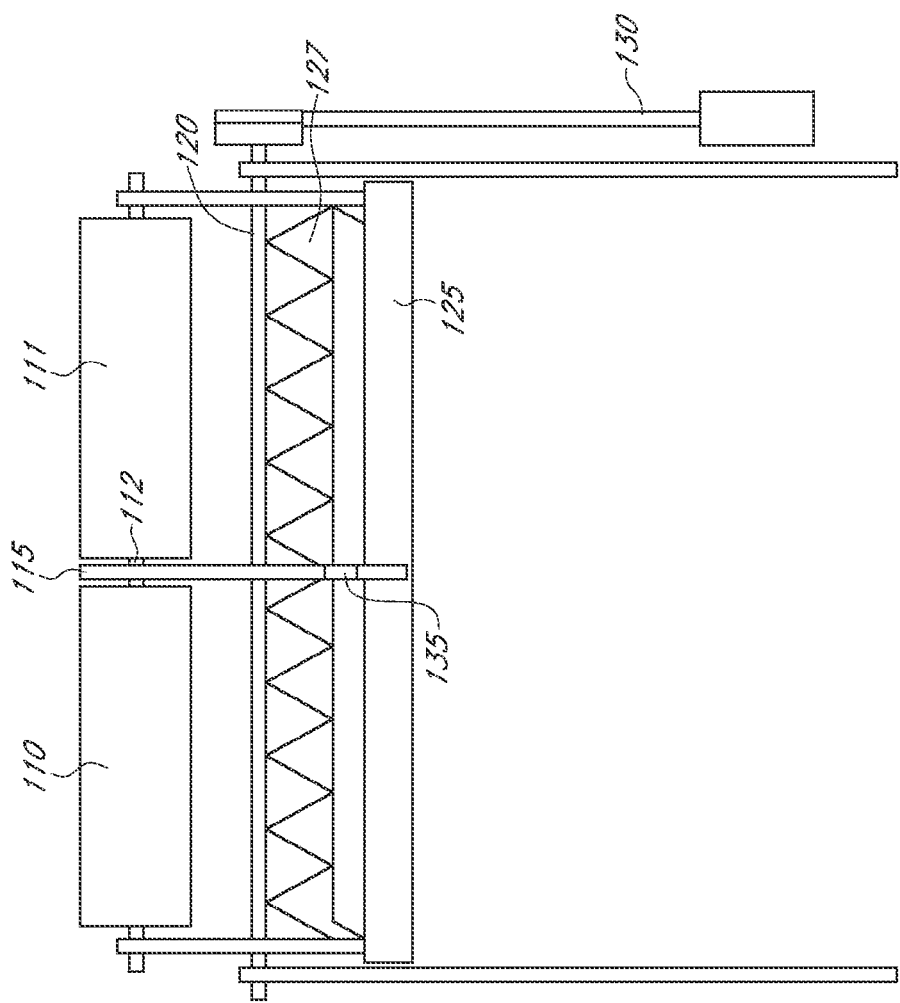
FIG. 1 shows a perspective view of an embodiment of the invention.

As shown in FIG. 1, a preferred embodiment exemplifying a best mode of a windmill 100 can include blades 110, 111 on one or more sides of a circular wheel 115. Each of the blades 110, 111 can rest on a blade shaft 112. The wheel 115 can connect multiple sections of the windmill 100 together. For each additional section, an additional wheel can be added such that a wheel 115 is placed between each section to support that additional section. A center shaft 120 can be duplicated for each additional section. For example, the windmill 100 can include three, four, or more sections, each with its own set of blades (such as 110). The wheel 115 rests on support wheels 135 and 136 (shown in FIG. 2). A first support wheel 135 and a second support wheel 136 (shown in FIG. 2) can support the wheel 115. The wheel 115 can support the blade shaft 112 and the center shaft 120. Also shown is a windbreak 125 attached to the windmill 100 that can have a jagged edge 127 to let the wind hit the windmill in a gradual manner. A fan 130 is used to turn blades away from the wind in case of a strong wind.

Figure 2:
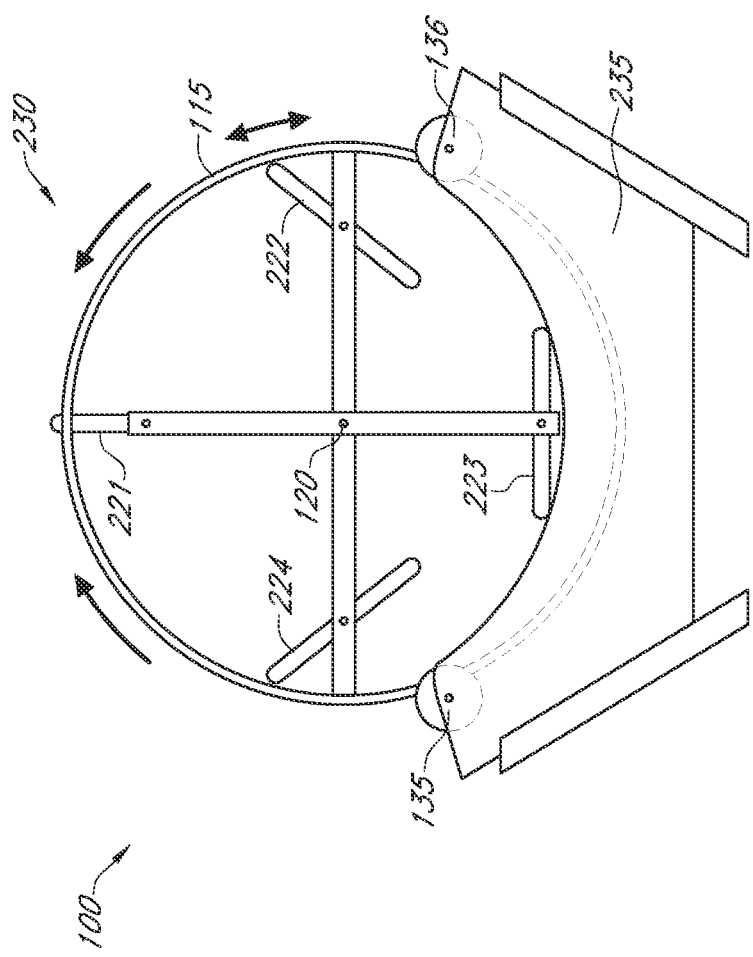
FIG. 2 shows a side view of an embodiment of the invention.

As shown in FIG. 2, the windmill 100 can turn blades 221, 222, 223, and 224. The blades 221, 222, 223, and 224 attached to the wheel 115 can be turned by wind 230 around the center shaft 120. A base 235 can serve as a windbreak for wind 230 approaching the windmill 100. The blades (221, 222, 223, and 224) can turn in a circular manner as wind pushes against the blades (221, 222, 223, and 224). The blades (221, 222, 223, and 224) can turn in the same direction as the wind blows. When the wind 230 is calm or not strong, a blade (such as 221) positioned at the top of the windmill 100 can be positioned in a vertical manner with respect to the ground, and a blade (such as 221) positioned at the bottom of the windmill 100 (such as 223) can be positioned in a horizontal manner with respect to the ground, as shown in FIG. 2. A blade positioned on a side of the windmill 100 (such as 222 and 224) can be positioned in a slanted manner in between vertical and horizontal with respect to the ground. All the blades 221, 222, 223 and 224 produce power to the windmill 100 except when they are sheltered from wind by the base 235, such as blade 223 as seen in FIG. 2. Shown also are the support wheels 135, 136 from FIG. 1.

Figure 3:
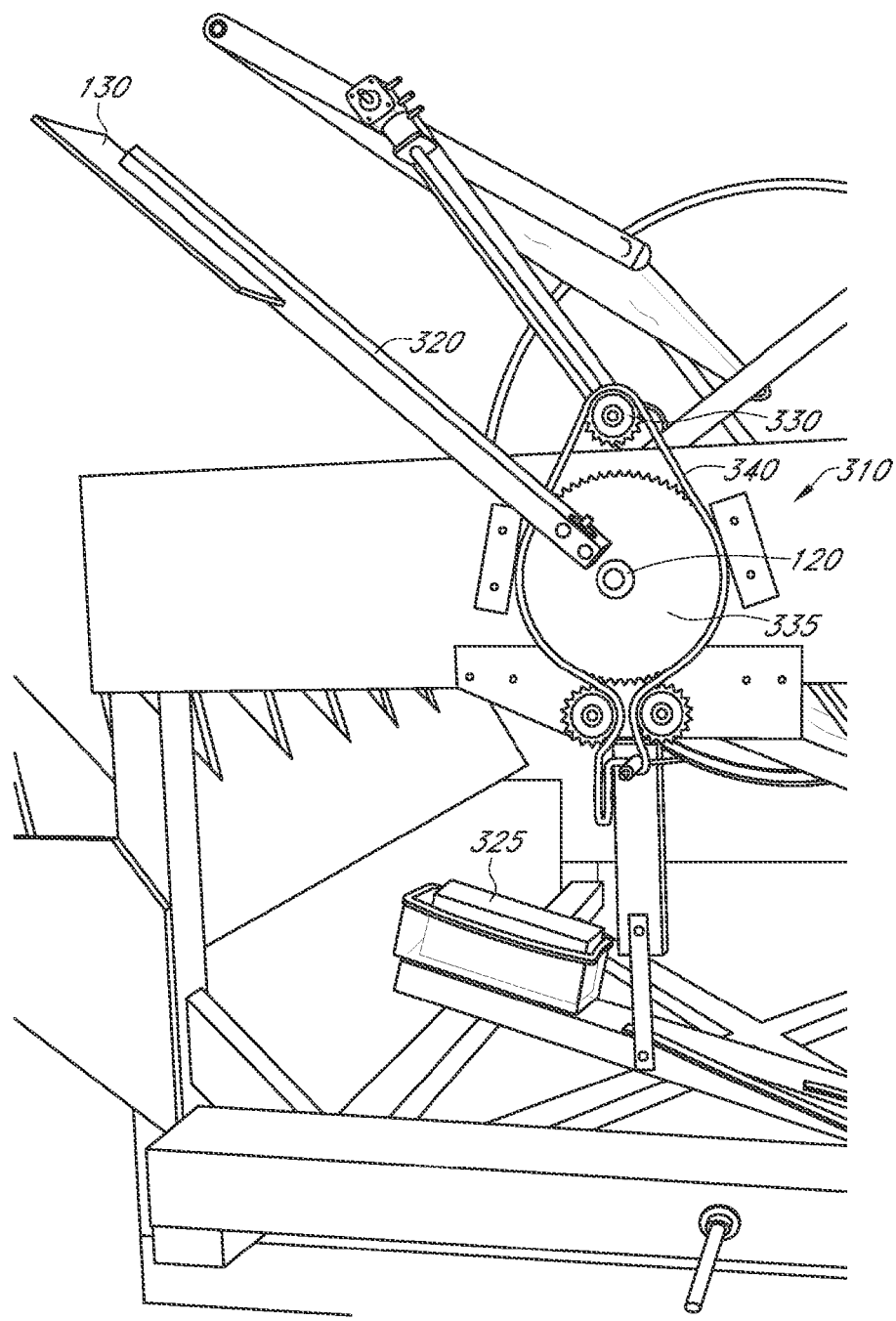
FIG. 3 shows another perspective view of an embodiment of the invention of FIG. 2.

As shown in FIG. 3, a fan 130 with a fan arm 320 can be attached to a sprocket and chain assembly 310. The sprocket and chain assembly 310 can rest on the center shaft 120. The sprocket and chain assembly 310 can include a first sprocket 330 and a second sprocket 335 larger than the first sprocket. A partial turn of the fan 130 can cause a partial turn of the first sprocket 330 and second sprocket 335, which can turn the blades (221, 222, 223, and 224 from FIG. 2) a quarter turn. A chain 340 can wrap around the first sprocket 330 and the second sprocket 335 such that when the fan 130 is pulled in a first direction (such as by a strong wind), the chain tightens on an opposite side of the first sprocket 330 and the second sprocket 335 from the first direction. A tightening of the chain 340 lifts the weight 325 and consequently turns the first sprocket 330 and second sprocket 335 a partial turn, and turns the blades (221, 222, 223, and 224 from FIG. 2) a quarter turn to turn the blades away from damaging wind. When the fan 130 is pulled in a second direction (such as by a strong wind, or by a calming of wind that previously pulled the fan in the first direction), the fan 130 is tightened in an opposite side of the first sprocket 330 and the second sprocket 335 from the second direction.

When the fan 130 is pulled in the first direction, the chain 340 is loosened on the same side of the first sprocket 330 and the second sprocket 335 as the first direction. When the fan 130 is pulled in a second direction opposite the first direction, the chain is loosened on the same side of the first sprocket 330 and the second sprocket 335 as the second direction. When wind calms, the weight 325 pulls the fan 130 back into an original position (such as the position of the fan 130 shown in FIG. 3).

Figure 4:
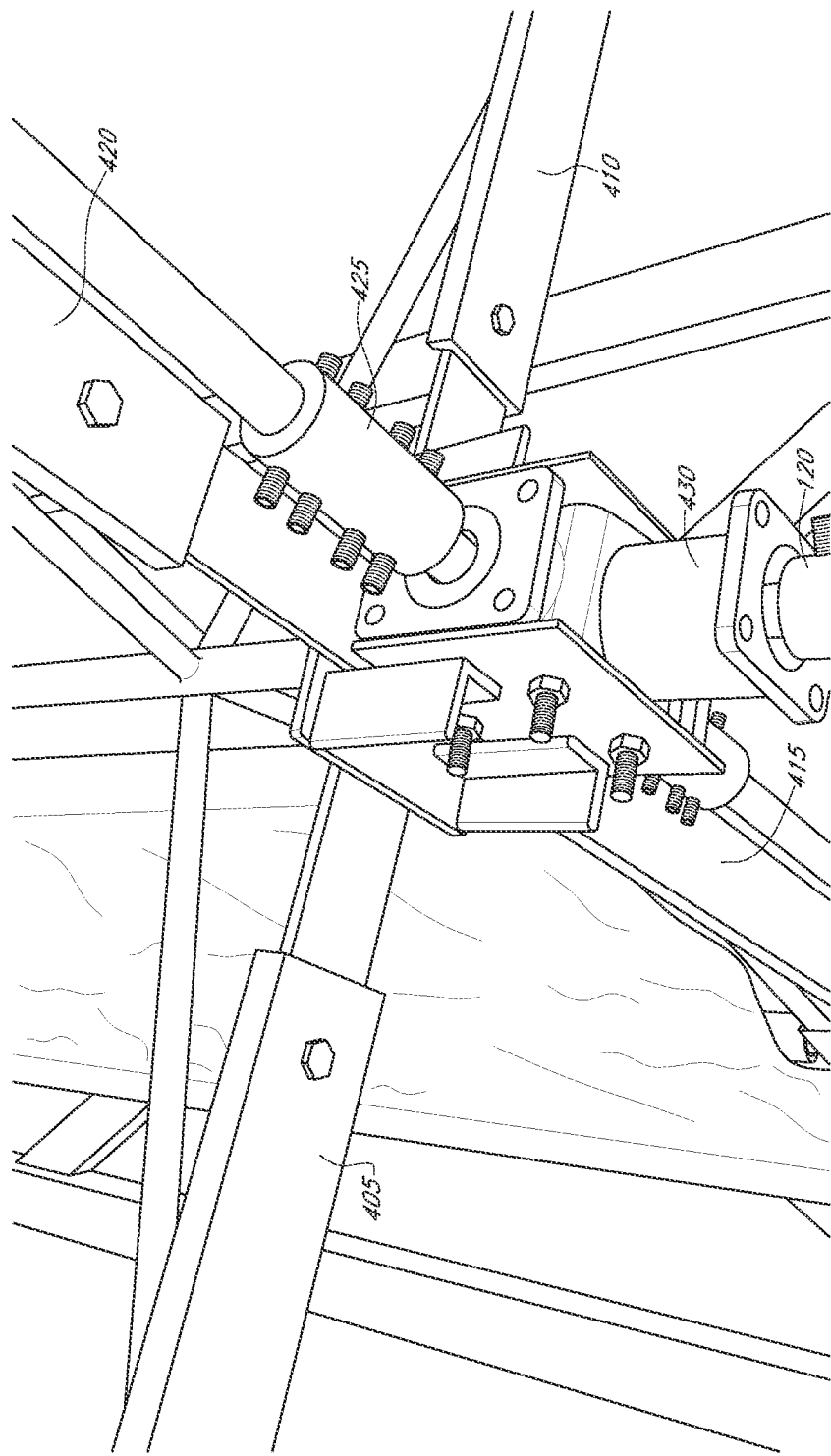
FIG. 4 shows a perspective view of some supports in the embodiment of the invention in FIG. 2.

FIG. 4 shows blade supports 405, 410, 415, and 420 for the blades (221, 222, 223, and 224 from FIG. 2). The windmill 100 can turn two times for each turn of blades (221, 222, 223, and 224 from FIG. 2). Other numbers of turns for each turn of blades (221, 222, 223, and 224 from FIG. 2) can be accomplished by the windmill 100 without departing from the scope of the invention. A blade support shaft 425 may support and apply power to the blades (221, 222, 223, and 224 from FIG. 2). The windmill 100 may turn two times for each turn of the blade support shaft 425. The blade support shaft 425 may connect a center gear case 430 to the blades (221, 222, 223, and 224 from FIG. 2). The center shaft 120 is connected to the center gear case 430 and the center shaft drives movement of the blade support shaft 425 through the center gear case 430.

Figure 5:
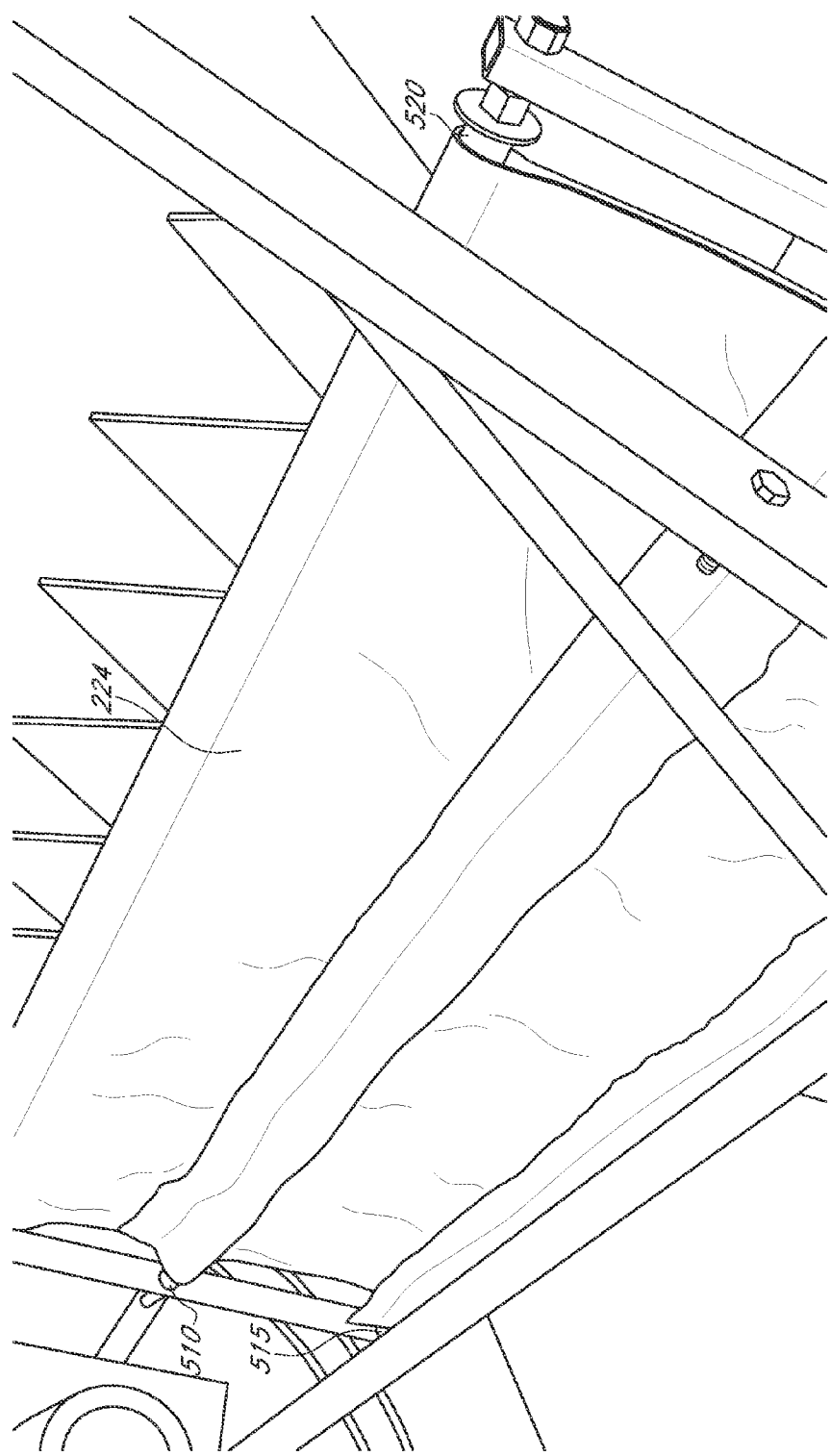
FIG. 5 shows a perspective view of a blade in the embodiment of the invention of FIG. 2.

Referring to FIG. 5, one of the blades 224 is shown. Blades (221, 222, 223, and 224 from FIG. 2) can be mounted on blade supports 510, 515, and 520.

Figure 6:
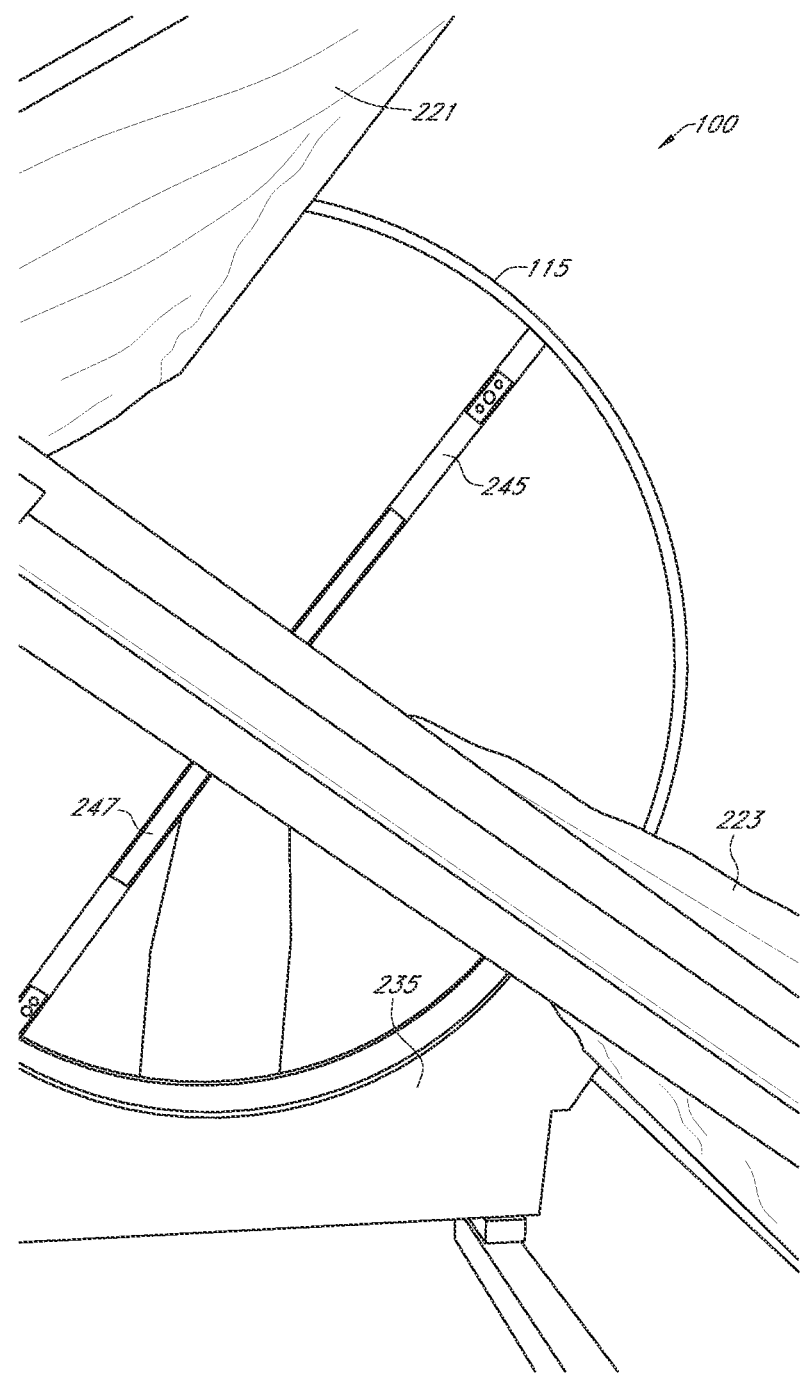
FIG. 6 shows a perspective view of a blade and wheel in the embodiment of the invention of FIG. 2.

Referring to FIG. 6, blades 221 and 223 are shown. The wheel 115 is shown with wheel support 245 and wheel support 247. The base 235 is shown supporting the windmill 100.

Figure 7:
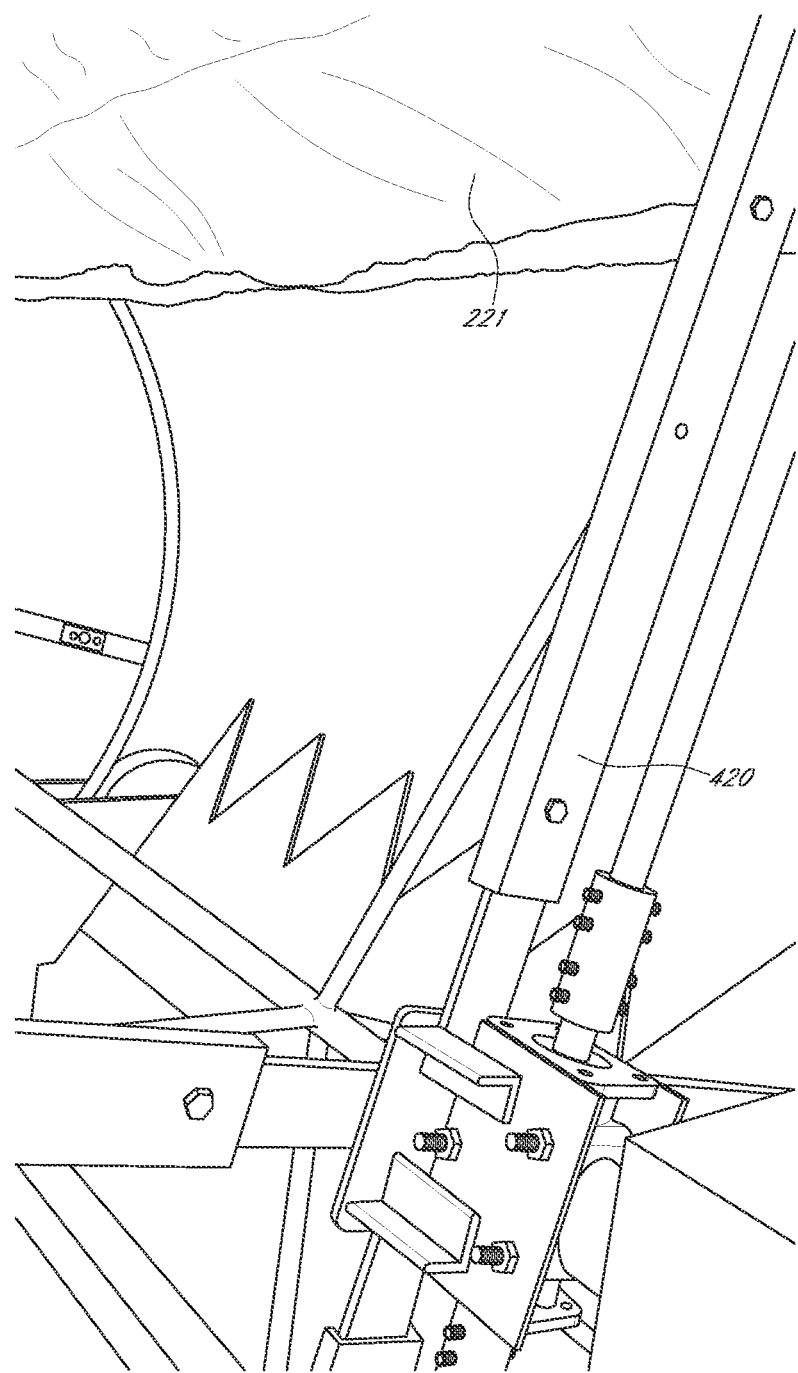
FIG. 7 shows a perspective view of supports, and a blade in the embodiment of the invention of FIG. 2.

Referring to FIG. 7, blade support 420 is shown supporting blade 221.

Figure 8:
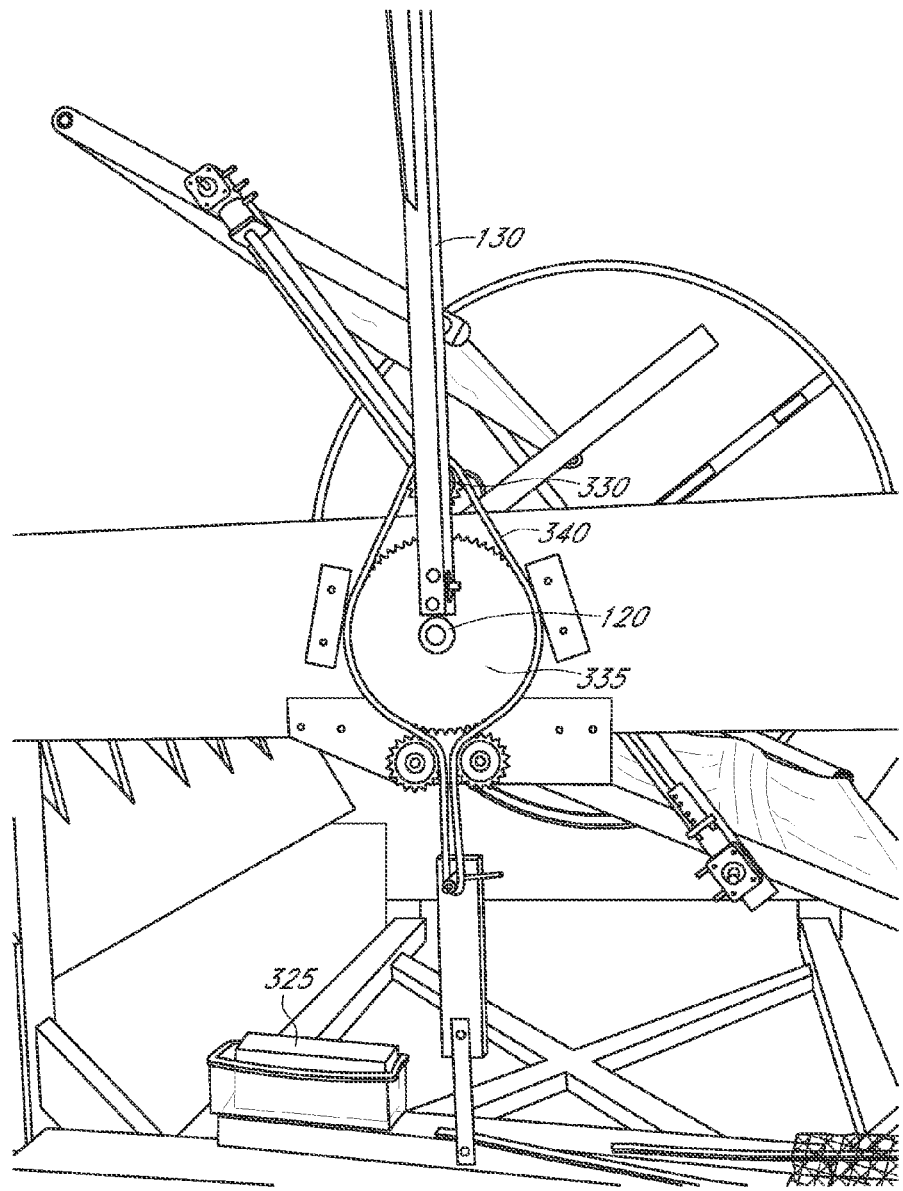
FIG. 8 shows a perspective view of sprockets in the embodiment of the invention of FIG. 2.

Referring to FIG. 8, the fan 130 is shown attached to the center shaft 120 along with the first sprocket 330, second sprocket 335 the chain 340, and the weight 325. See further description above with the description of FIG. 3.

Figure 9:
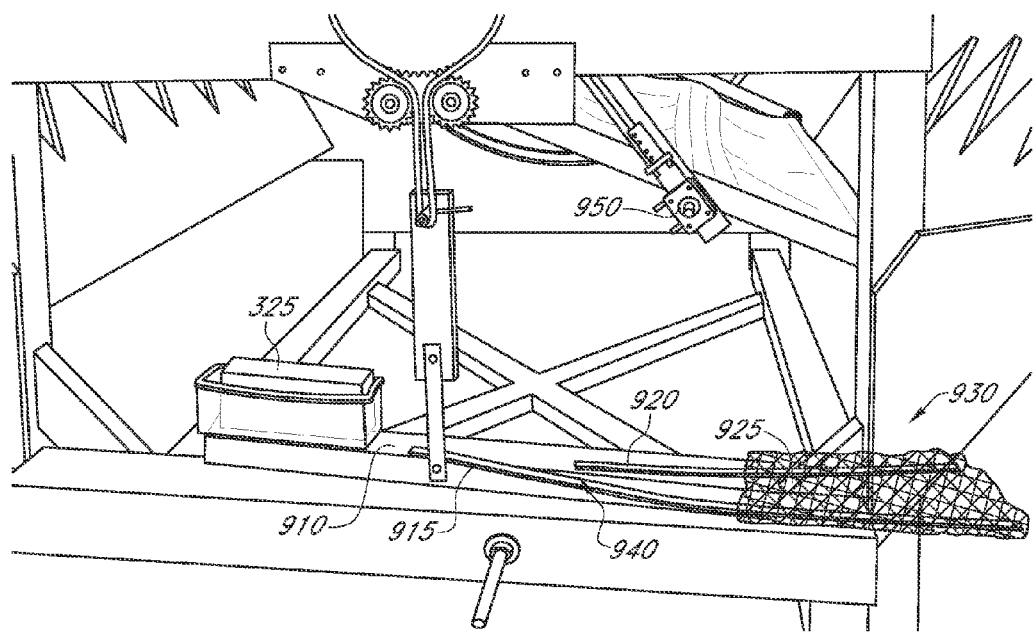
FIG. 9 shows a perspective view of an ice-catcher in the embodiment of the invention of FIG. 2.

Referring to FIG. 9, an ice-catcher 930 is shown, with a first ice-catcher arm 915 and a second ice-catcher arm 920. The ice-catcher 930 can include netting 925 that can, for example, catch ice, snow, and freezing rain. When ice building up on the blades (221, 222, 223, and 224 from FIG. 2) becomes dangerously heavy, then the weight of the ice on the ice-catcher 930 may be approximately equal to the weight of the weight 325. Then the fan 130 (FIG. 11) has no weight to lift and the slightest wind can move the fan 130 (FIG. 11) and turn the windmill 100 (FIG. 1) out of the wind. For example, blades (221, 222, 223, and 224 from FIG. 2) may be turned by the fan (130, FIG. 11) a quarter turn out of a direction of the wind, to prevent damage to the blades (221, 222, 223, and 224 from FIG. 2) from damaging wind. The first ice-catcher arm 915 and the second ice-catcher arm 920 can be attached to a weight support arm 910 which supports the weight 325. The netting 925 can be a wire mesh adapted to hold ice. The downward pull of the ice-catcher 930 around a pivot point 940 can shut down the windmill to a reduced speed, by rotating the blades (221, 222, 223, and 224 from FIG. 2) so that the blades catch less wind. Also shown is a blade gear case 950 that may apply power to one of the blades (221, 222, 223, and 224 from FIG. 2).

Figure 10:
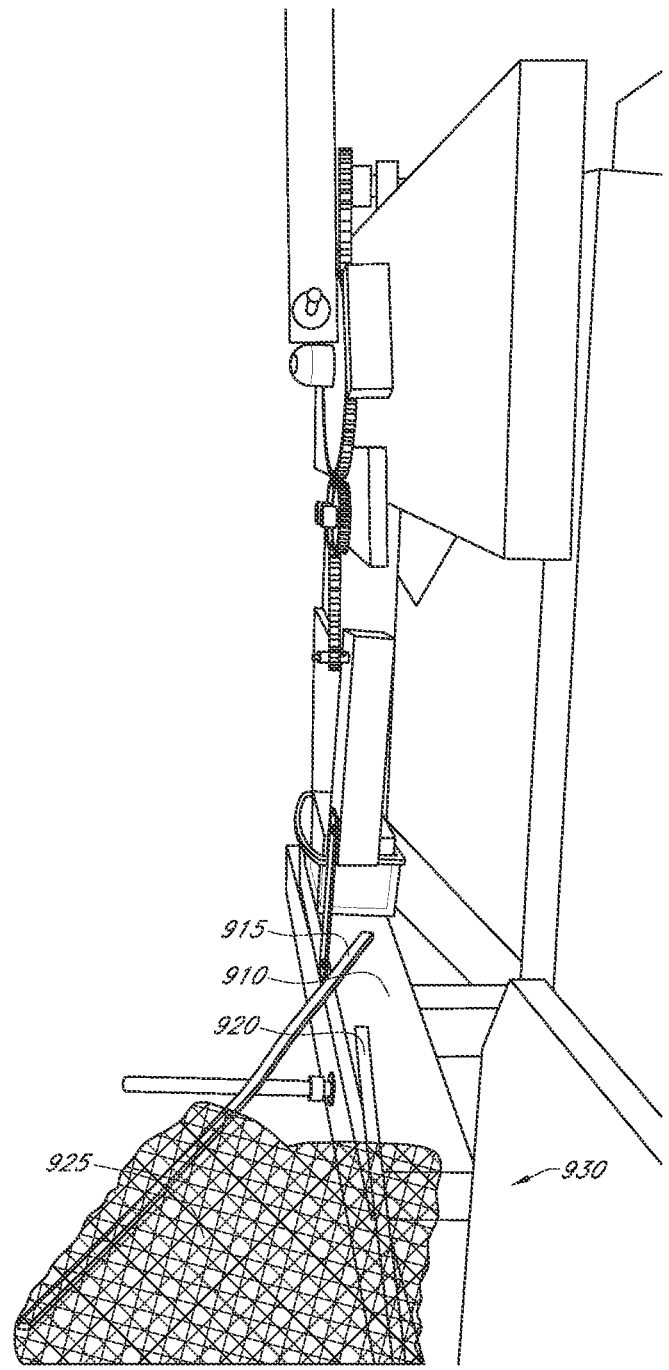
FIG. 10 shows another perspective view of the ice-catcher in the embodiment of the invention of FIG. 2.

Referring to FIG. 10, the ice-catcher 930 is shown with its netting 925, the first ice-catcher arm 915 and the second ice-catcher arm 920, attached to the weight support arm 910.

Figure 11:
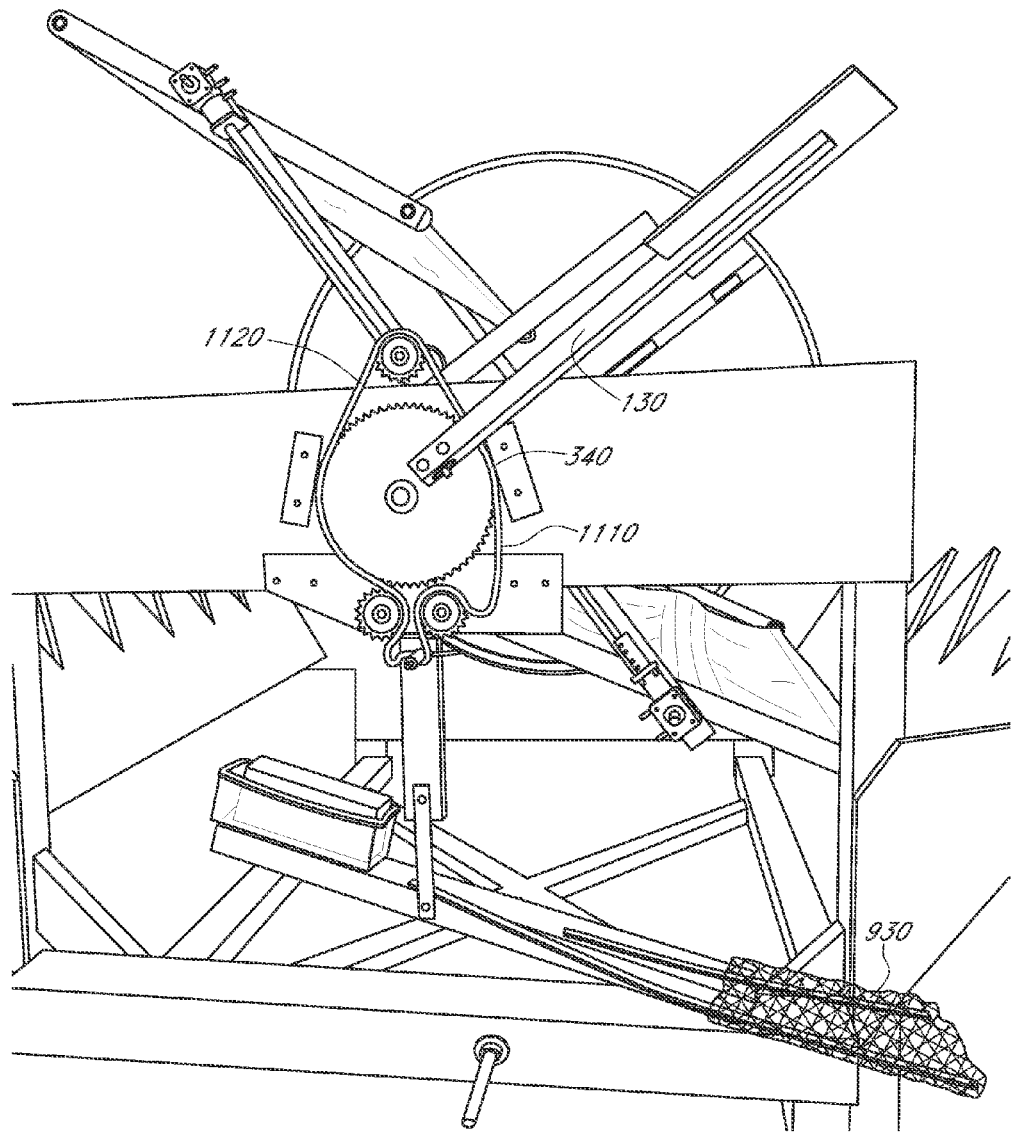
FIG. 11 shows a perspective view of a fan and sprockets in the embodiment of the invention of FIG. 2.

Referring to FIG. 11, the fan 130 is shown being pulled down towards the ice-catcher 930. A far side 1120 of the chain 340 can be tightened, pulling the ice-catcher upwards away from the ground. A near side 1110 of the chain 340 can be loosened by the pulling down of the fan 130 towards the ice-catcher 930.

Figure 12:
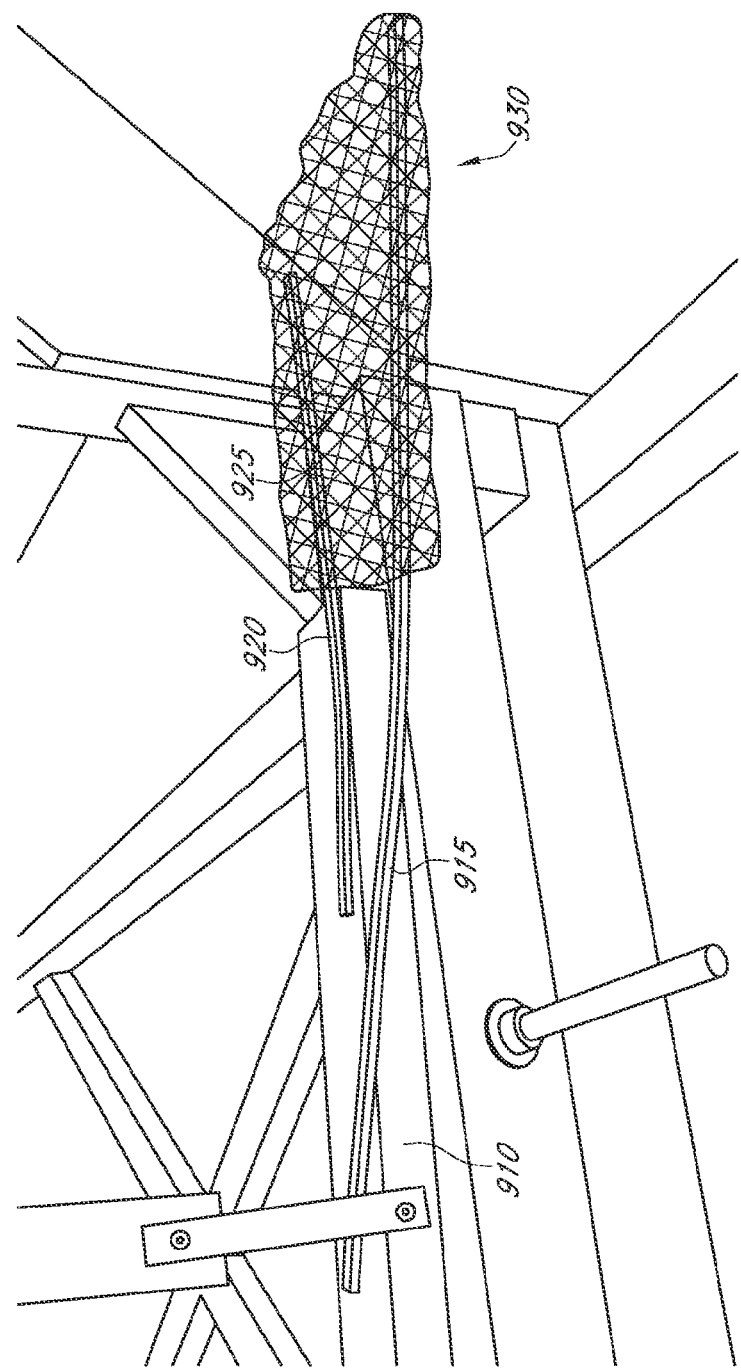
FIG. 12 shows another perspective view of the ice-catcher in the embodiment of the invention of FIG. 2.

Referring to FIG. 12, shown is another view of the ice-catcher 930, with netting 925, the first ice-catcher arm 915 and the second ice-catcher arm 920, attached to the weight support arm 910.

The invention can be made of any suitable material including but not limited to, cloth products, plastic products, rubber products, and other natural or human made materials.

The above description can be modified without departing from the scope of the claims below.

What is claimed is:

1. A windmill, comprising:
   a first blade assembly including a plurality of blades;
   a base assembly configured to support the windmill, wherein the base assembly is configured to serve as a windbreak to at least one of the plurality of blades:
   a sprocket and chain assembly configured to turn the first blade assembly in and out of an incoming wind;
   a wheel assembly, wherein the wheel assembly supports the first blade assembly
   a pair of support wheel assemblies resting on the base assembly, wherein the pair of support wheel assemblies are configured to support the wheel assembly on opposite ends of the wheel assembly;
   a fan assembly configured to move the sprocket and chain assembly to turn the first blade assembly a quarter turn for avoidance of damage to the windmill from a damaging wind; and
   a windbreak with a jagged edge is attached to the windmill, wherein the windbreak is configured to route wind to the windmill in a gradual manner.

2. The windmill of claim 1, wherein the wheel assembly supports a second blade assembly.

3. The windmill of claim 2, wherein a second wheel assembly supports a third blade assembly, wherein the third blade assembly is attached to the second blade assembly.

4. The windmill of claim 3, wherein a third wheel assembly supports a fourth blade assembly, wherein the fourth blade assembly is attached to the third blade assembly.

5. The windmill of claim 1, including an ice-catcher assembly with netting configured to catch ice, wherein the ice-catcher is configured to turn the sprocket and chain assembly such that the plurality of blades are turned a quarter turn for avoidance of damage to the windmill from a damaging wind, when there is an added weight of ice buildup on the plurality of blades.

6. The windmill of claim 1, including a weight configured to move the sprocket and chain assembly back into an original position in response to a strong wind ceasing to blow against the windmill.

* * * * *